March 9, 1965     H. B. DRAPEAU     3,172,602
WATERLINE THERMOSTAT
Filed Dec. 26, 1962     2 Sheets-Sheet 1
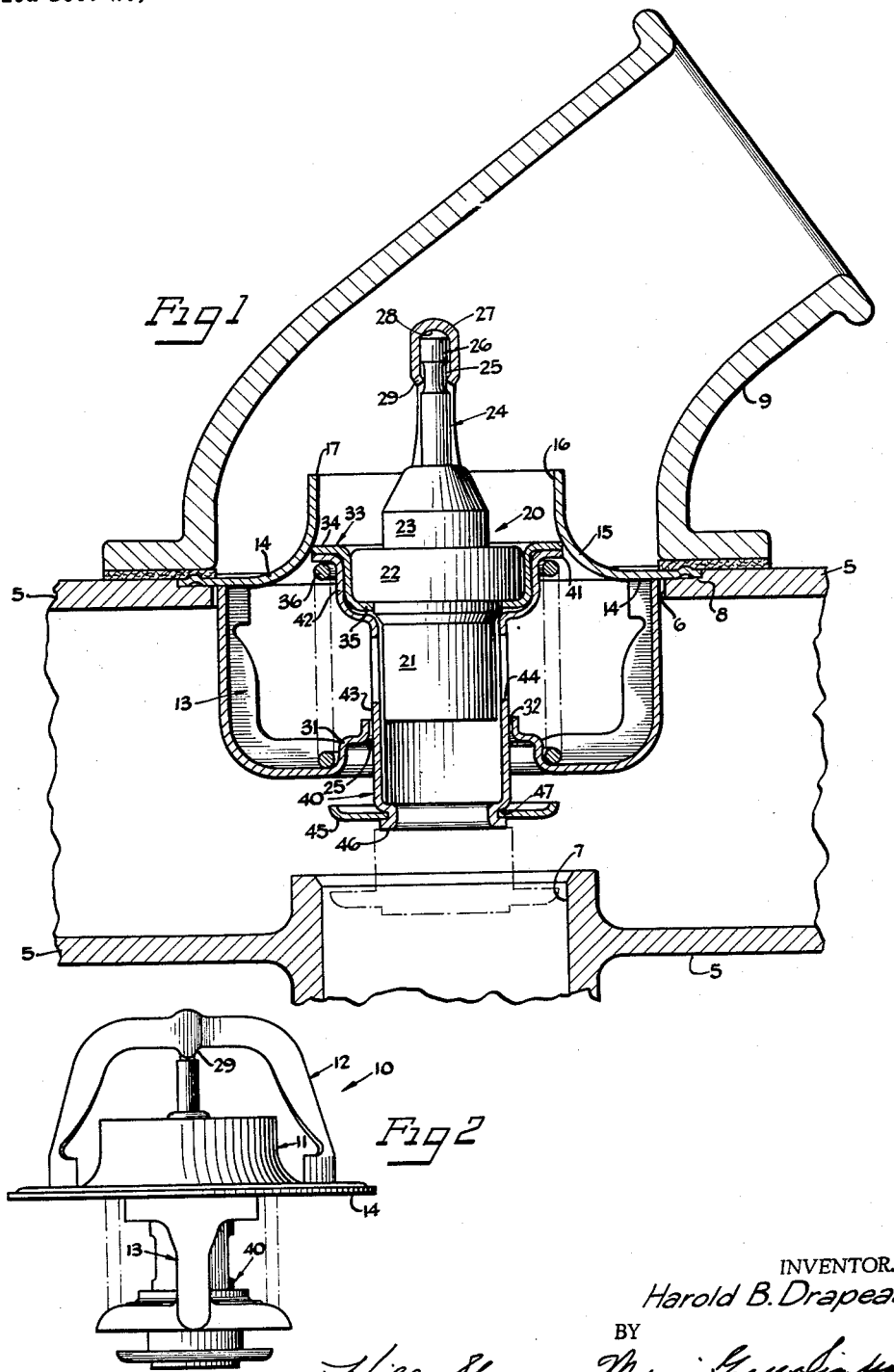
INVENTOR.
Harold B. Drapeau
BY
ATTORNEYS March 9, 1965 H. B. DRAPEAU 3,172,602
WATERLINE THERMOSTAT
Filed Dec. 26, 1962 2 Sheets-Sheet 2
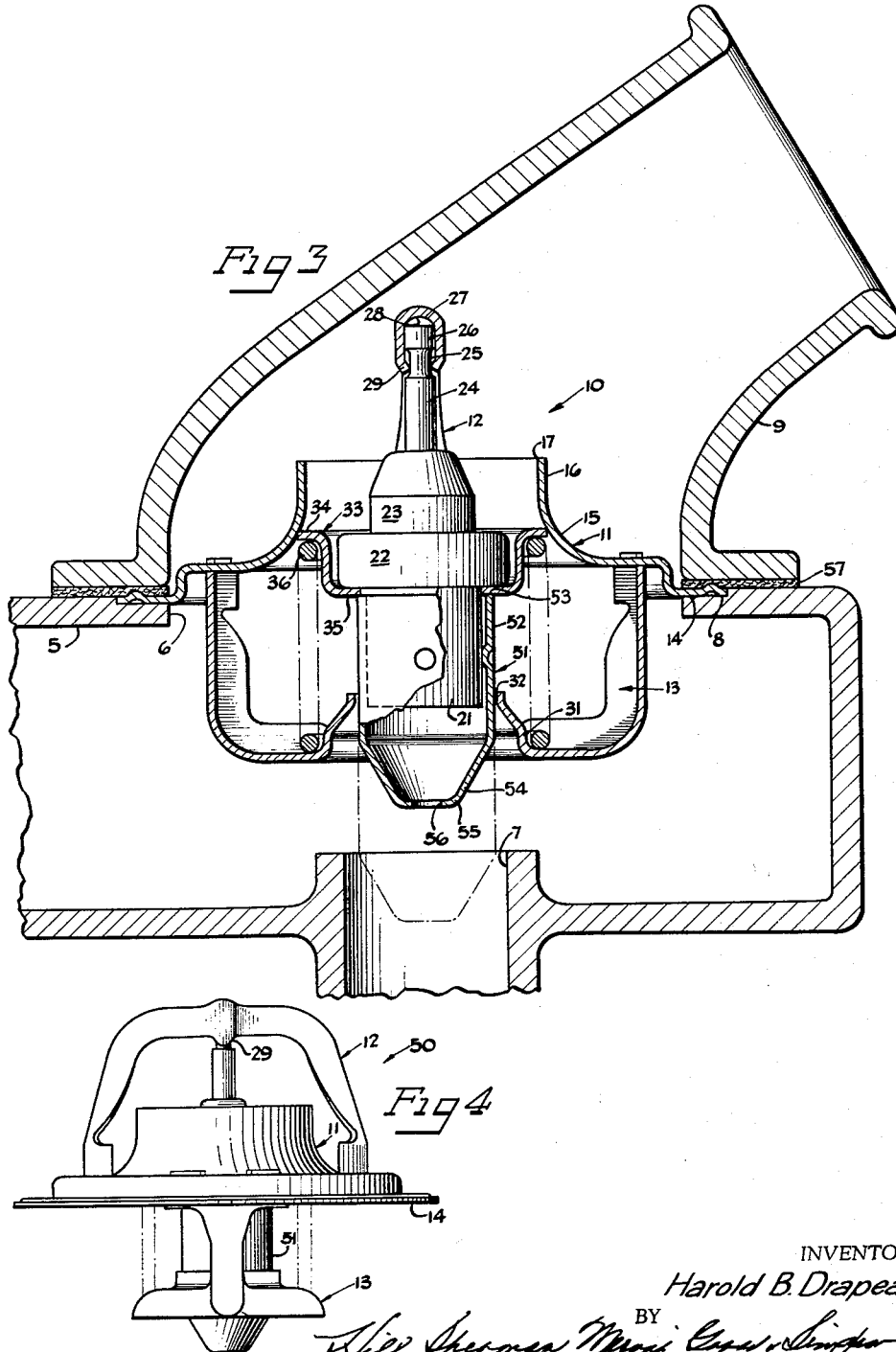
INVENTOR.
Harold B. Drapeau
BY
ATTORNEYS

United States Patent Office

3,172,602
Patented Mar. 9, 1965

3,172,602
WATERLINE THERMOSTAT
Harold B. Drapeau, Oak Park, Ill., assignor to The Dole Valve Company, Morton Grove, Ill., a corporation of Illinois
Filed Dec. 26, 1962, Ser. No. 246,904
7 Claims. (Cl. 236—34.5)

This invention generally relates to a fluid control valve and more particularly relates to valves which are adapted to be employed as waterline thermostats and also to be employed to regulate the bypass flow of cooling fluid in vehicle cooling systems.

Bypass thermostatic valves have been plagued with the perennial problem of valve cost, valve breakdown, and valve leakage. Bypass thermostatic valves are predominantly used in the cooling conduits of road vehicles to control either fluid flow to the radiator conduit or to a bypass conduit to bypass the radiator and to return the fluid to the engine block. These valves required special sealing glands that connected the valves to the cooling conduits and also acted as a flow passage for fluid flowing to the radiator. Also, these valves required special high-cost machined housings that had to be exactly dimensioned to both act with the sealing gland to prevent flow therethrough and to act with the bypass conduit to prevent flow therethrough when desired.

The constant flow of fluid and pressure on the diaphragm caused the diaphragm to distort and wear and allowed cooling fluid to leak prematurely therethrough. As is evident, leakage of cooling fluid from the engine block to the radiator while the fluid is still cold is quite undesirable. Even a small flow of coolant past the valve member under such conditions, will substantially increase the time required for engine "warm-up" to be effected.

The present invention eliminates the detrimental aspects of known bypass thermostatic valves by eliminating the need for high-cost specially machined valve housings and special sealing glands. My thermostatic valve beneficially incorporates the inexpensive and beneficial features of waterline thermostats and their connections and provides an auxiliary bypass valve thereon that can effectively provide coolant flow in a downward bypass cooling system.

It is therefore an object of the present invention to provide a waterline thermostat having an auxiliary bypass valve thereon.

It is still another object of the present invention that eliminates the necessity of special sealing glands in a cooling system utilizing a thermostatic bypass valve.

It is further another object of the present invention to provide a downward bypass cooling system utilizing a bypass waterline thermostat.

It is further another object of the present invention to provide a bypass waterline thermostat with a bypass valve that modulates the radiator bypass flow.

It is another object of the present invention to provide a waterline thermostat which is of simple design and may be readily manufactured for controlling both fluid flow to the radiator and the bypass of fluid around the radiator.

These and other objects, features and advantages of the present invention will become more apparent from a careful consideration of the following detailed description, when considered in conjunction with the accompanying drawings illustrating preferred embodiments of the present invention, and wherein like reference numerals and characters refer to like and corresponding parts throughout the several views therein.

On the drawings:

FIGURE 1 is a vertical cross-sectional view through a waterline thermostat, constructed in accordance with the principles of the present invention, and the cooling conduits of an internal combustion engine;

FIGURE 2 is a side elevational view of the waterline bypass thermostat shown in FIGURE 1;

FIGURE 3 is another vertical cross-sectional view through a slightly modified waterline thermostat, constructed in accordance with the principles of the present invention, and the coolant conduits of an internal combustion engine; and FIGURE 4 is a side elevational view of the bypass waterline thermostat illustrated in FIGURE 3.

As shown on the drawings:

The present invention deals with the cooling conduits of an internal combustion engine and is particularly concerned with the improvement formed by placing an improved bypass waterline thermostat having an auxiliary valve to control a bottom bypass cooling fluid system. The bypass waterline thermostat has a flanged transverse wall.

The transverse wall flange provides the mounting for the bypass waterline thermostat while the transverse wall acts as a flow passage for the cooling fluid flowing to the radiator. The use of the transverse wall as a flow passage eliminates the need for auxiliary and expensive diaphragm and mounting means used in known bypass thermostat valves.

In order to utilize the improved downward bypass cooling system, a waterline thermostat is provided with an auxiliary valve member that is attached to the power unit temperature sensitive portion so as to move in a linear direction therewith. The bypass conduit orifice of the cooling system is preferably slightly larger than the auxiliary valve connected to the power member, and is aligned therewith to allow a leakage into the bypass conduit. This leakage is regulated and is used to supercharge the pump suction with cylinder head pressure to prevent cavitation.

Referring to FIGURE 1, a coolant conduit 5 is connected at both ends to a motor vehicle engine (not shown) and is ported in opposing wall portions as indicated at 6 and 7 for reasons which will hereinafter become obvious.

The port 6 has a shoulder 8 around the inner circumference thereof forming the minimum diameter of the port which is arranged to seat a bypass waterline thermostatic valve 10 constructed in accordance with the present invention. A hose fitting 9 is connected to the coolant conduit 5 and is in communication with the port 6 for purposes of carrying coolant from the conduit 6 to a radiator or some other well known type of cooling means.

Referring to FIGURES 1 and 2, the waterline thermostat 10 is shown as comprising a ported transverse wall 11 having a stirrup 12 extending therefrom and a combination power unit guide and spring support or base wall piece 13 connected thereto on the opposite side thereof from the stirrup 12. The stirrup 12 and base wall piece 13 are affixed to the transverse wall 11 by means of riveting or any other suitable means.

The transverse wall 11 has a flange 14 extending therearound which provides a means for mounting the thermostat in a fluid conduit so that the valve can control the passage of fluid therethrough.

The transverse wall 11 has a neck 15 formed integrally therewith which interconnects the horizontal portion of the wall with a straight walled diverging throat 16 which, in turn, terminates in a port 17.

The curvilinear neck 15 is preferably described by radii of different lengths so that a region of greater curvature is formed upstream of a region of lesser curvature.

The throat 16 leads from the curvilinear neck 15 to the port 17 and diverges from the center axis of the throat to provide full flow of fluid through the throat as will hereafter be pointed out. The curvilinear neck portion substantially reduces the high frequency vibrations generated by the forces of highly pressurized fluid impinging on the upstream face of the valve member and which caused valve breakage and distortion.

A temperature sensitive power unit 20 is of the well known "solid-fill" type and comprises a temperature sensitive portion 21, a collar 22, a power member guide portion 23, and a power member 24. The thermostat contains a fusible thermally expansible material within the temperature sensitive portion 21 which expands when the ambient temperature rises to or above the critical temperature of the expansible material. The expansible material acts against a diaphragm within the power unit which, in turn, abuts or is connected to the power member 24 so that heating of the temperature sensitive portion 21 above the critical temperature of the expansible material contained therein will effect relative extensible movement of the power member 24 from the casing of the power unit. For the purposes of simplicity, that portion of the power unit 20 which includes a temperature sensitive portion 21, the collar 22, and the guide portion 23 is referred to as the casing.

It will be noted that the free end of the power member 24 has a circumferential recess 25 which is formed therearound and which defines a head 26 at the outer end of the power member. The head 26 has a rounded end surface 27 which fits within a complementary socket 28 formed in the stirrup 12. The socket 28 can be formed in any desired manner and simply constitutes a rounded out portion of the stirrup 12. It is important to note however that curvilinear fingers 29 are formed integrally with the stirrup 12 and extend around the head 27 and are bent inwardly within the circumferential recess 25 on opposite sides of the power member to positively prevent the power member 24 from having any axial movement with respect to the stirrup 12. It will be noted however that the curvilinear fingers 29 are inturned only a sufficient distance to prevent the head 26 from moving out of the socket 28 and that they do not prevent the power member 24 from having rockable movement with respect to the socket 28. The rounded end 27 of the head 26 will therefore be free to rock slightly within the socket 28; a very small amount of rockable movement being all that is necessary to obviate the disadvantages of prior completely rigid types of devices which would distort or break due to the complete rigidity of the stirrup.

The base wall piece 13 is affixed to the transverse wall 11 in preferably the same manner as the stirrup is affixed to that wall and extends from the wall in an opposite direction from the stirrup 12. The base wall piece 13 has an upturned spring guide portion 31 extending centrally thereof in the direction of the port 17 and this spring guide portion is apertured as at 32 to provide a guide.

A valve member 33 is effective to control the flow of fluid through the port 17 and includes an outturned flange portion 34 which is engageable with the curvilinear neck 15 to shut off the flow of fluid through the port 17. The valve member 33 also has an inwardly extending flange 35 formed integrally therewith which is centrally apertured to receive the temperature sensitive portion 21 of the power unit 20. The inturned flange 35 seats upon the collar 22.

A tubular bypass sleeve member 40 surrounds the power unit collar 22 and temperature sensitive portion 21. The sleeve 40 has an integral flange 41 that is contiguous with and abuts the bottom face of the valve flange 34 and a side wall 42 that abuts and is contiguous with the side walls of the main valve 33. The sleeve has a cylindrical portion 43 that extends a predetermined distance below the bottom of the base wall piece 13. The cylindrical portion 43 does not contact the temperature sensitive portion 21 and has a plurality of longitudinal apertures 44 therein that allows coolant to contact the temperature sensitive portion 21.

On the other end 46 of the sleeve 40 extending below the bottom of the base wall 13 is mounted an auxiliary circular bypass valve 45. The bypass valve is attached by spinning the other end 46 over the valve 45 to provide the valve retaining groove 47.

The inturned flange 35 is seated on the collar 22 and the sleeve flange is seated on the main valve flange 34 and they are preferably maintained in engagement therewith by means of a power unit return spring 36 which is interposed between the outturned sleeve flange 41 and the base wall piece 13. The spring 36 thus serves the threefold purpose of positively mounting the valve member 33 on the collar 22, positively mounting the bypass valve on the main valve, and of acting as a means for returning the power unit to the position illustrated in FIGURE 1 upon cooling of the temperature sensitive substance within the temperature sensitive portion 21. The spring 36 extends around the spring guide portion 31 of the base wall piece 30 and is thereby maintained in its proper position on the base wall piece.

Referring to FIGURES 3 and 4, there is illustrated a bypass waterline thermostat 50 similar to the bypass thermostat 10 illustrated in FIGURES 1 and 2 and the corresponding parts are so numbered. However, the bypass waterline thermostat 50 has a bypass valve 51 connected thereto. The bypass valve 51 has a cylindrical sleeve 52 press fitted over the temperature sensitive element 21 and having one end 53 abutting against the main valve inturned flange 35 and the other end 54 is convergingly tapered and provided with inturned flanges 55 defining an aperture 56. The bypass valve extends below the bottom wall of the base wall piece 13 and is guided by the guide 32.

The main valve 33 is positively mounted on the collar unit 22 by interposing a power unit return spring 36 between the outturned flange 34 and the base wall piece 13.

The bypass waterline thermostats of the present invention have their flange 14 seated on the conduit port shoulder 8. As is well known in the art, a gasket 57 is provided between the conduit 5 and the hose fitting 9 for purposes of providing a fluid tight seal therebetween.

The auxiliary bypass valve is mounted for linear movement with the movement of the main valve. The auxiliary valve is guided by the base wall guideway 32 and passes into the port 7 opposite the port 6. The auxiliary valve is so sized that it will preferably not stop flow to the port 7 but will merely restrict the flow thereto. The advantages of having a modulated flow of coolant through the bypass port 7 was explained above. The main valve opens and the auxiliary valve moves therewith against the direction of flow of the coolant. A fixed open leakage equivalent to a three-eighth inch orifice is recommended for providing the most efficient use of said bypass leakage.

It is, of course, understood that although the above invention has been described in conjunction with waterline thermostats having a rockable mounting and a curvilinear flow neck, the cooling system of the present invention is also applicable with other known types of downward opening waterline thermostats not having these features.

In operation, the bypass waterline thermostats of the present invention are mounted in a cooling system conduit having a pair of opposed ports. One of said ports leads to the radiator and the other leads to a bypass conduit that bypasses the flow around the radiator to return to the engine block. If the temperature of the coolant within the engine block is initially quite cold, the main valve 33 will be closed and the coolant will flow through the bypass port 7 and return to the engine block. This circulation of coolant is maintained until the engine block is heated and the temperature of the coolant is raised above its critical temperature.

The ambient temperature around the temperature sensitive portion 21 is raised by the coolant and when the heated coolant raises this temperature above the critical temperature of the temperature sensitive substance contained therein, that substance will expand and cause the casing and the power member 24 to move axially relative to one another. The power member 24 is prevented from moving axially by the manner in which the head 26 is mounted within the socket 28 and the casing will accordingly back off from the stirrup 12. As the casing backs away from the stirrup the valve member 33 will be unseated from the flow neck 15 and the auxiliary valves will move into the port 7 as is indicated by the ghost lines of FIGURES 1 and 3. The unseating of valve 33 permits the liquid within the engine block to travel to the radiator and the auxiliary valve permits a desired portion thereof to leak through the bypass port 7. When the ambient temperature about the temperature sensitive portion 21 decreases so that it is lower than the critical temperature of the temperature sensitive substance contained therein, the compression spring 36 will act against the valve member 33 which, in turn, will act against the casing and the auxiliary valve to seat the main valve 33 and stop flow to the radiator and fully open the bypass port to circulate all the engine block fluid. Thus, the bypass waterline thermostat effectively maintains the engine block at its desired temperature.

It will be understood that these embodiments of the invention have been used for illustrative purposes only and that various modifications and variations in the present invention may be effected without departing from the spirit and scope of the novel concept thereof.

I claim as my invention:

1. A reverse poppet waterline thermostat comprising:
   a transverse wall having means defining a flow passage;
   said transverse wall having a flange adapted to connect the thermostat to a cooling conduit and to allow flow through only the transverse wall flow passage;
   a power unit extending through said passage and spaced from said means defining the passage;
   said power unit having a power member, a power member guide portion, a power unit collar, and a temperature sensitive portion;
   a stirrup connected to said power member and affixed to said transverse wall;
   a base wall affixed to the side of the transverse wall opposite the stirrup;
   a main valve having an outwardly turned flange to engage closely with said flow passage defining means and an inwardly turned flange seated against the power unit collar;
   an auxiliary valve structure including a sleeve portion about said temperature sensitive portion and having an end flange seating with said outwardly turned flange;
   said sleeve portion extending in linearly movably guided relation through said base wall;
   and a compression spring thrusting at one end against said base wall and at its opposite end against said end flange.

2. A reverse poppet waterline thermostat comprising:
   a transverse wall having means defining a flow passage;
   said transverse wall having a flange adapted to connect the thermostat across a cooling conduit and to allow flow through only the transverse wall flow passage;
   a power unit extending through said passage and spaced from said means defining the passage;
   said power unit having a power member, a power member guide portion, and a temperature sensitive portion;
   a stirrup connected to said power member and affixed to said transverse wall;
   a base wall affixed to the side of the transverse wall opposite the stirrup;
   a main valve connected to the power unit to move linearly therewith and arranged normally to engage said passage defining means to close said flow passage;
   an auxiliary valve structure comprising a sleeve portion press fitted onto said temperature sensitive portion;
   said sleeve portion extending beyond said pressure sensitive portion and being linearly movably guided through said base wall and having a tapered terminal valve portion adapted for entry into a bypass port of substantially larger differential diameter wherein the tapered valve portion is freely received for modulating passage of fluid through the bypass port.

3. A thermostat as defined in claim 1, in which the power member and the stirrup are rockably connected.

4. A thermostat as defined in claim 2, wherein said power unit and the stirrup are rockably connected.

5. A power unit as defined in claim 1, wherein said sleeve portion is ported.

6. A thermostat as defined in claim 2, wherein said sleeve portion is ported.

7. A cooling system for a vehicle comprising:
   a fluid conduit for connection to the block of an internal combustion engine;
   said conduit having first and second spaced and aligned ports;
   said first port having a cylindrical wall and being a bypass port for bypassing fluid back to the block of the engine.
   said second port adapted for connection with the radiator of the engine;
   a reverse poppet thermostat in control of said ports and including a transverse wall defining a flow passage;
   said transverse wall having a flange secured across said second port and thereby allowing flow only through said flow passage;
   a power unit extending through said flow passage and being of smaller diameter than the passage;
   said power unit having a power member, a power member guide portion, and a temperature sensitive portion;
   a stirrup connected to said power member and affixed to said transverse wall;
   a base wall affixed to the side of the transverse wall opposite the stirrup;
   a main valve connected to the power unit to move linearly therewith;
   said main valve normally positioned to close the transverse wall flow passage;
   an auxiliary valve structure including a sleeve portion about said temperature sensitive portion and linearly movable therewith an extending in linearly movably guided relation through said base wall and having a terminal valve portion of differently smaller diameter than said bypass port and so related to the bypass port that in the fully open position of said main valve said valve portion is extended freely into the bypass port to substantially block flow therethrough but permitting a modulated limited flow through the bypass port.

References Cited by the Examiner

UNITED STATES PATENTS 2,815,174  12/57  Rimsha _____ 236—34
3,092,322  6/63   Schwarz _____ 236—34.5

OTHER REFERENCES

Wahler: German Printed Application No. 1,035,408, 7/58, 236—34.5.

EDWARD J. MICHAEL, *Primary Examiner.*